United States Patent
Pavlichenko et al.

(10) Patent No.: US 12,353,968 B2
(45) Date of Patent: Jul. 8, 2025

(54) METHODS AND SYSTEMS FOR GENERATING TRAINING DATA FOR COMPUTER-EXECUTABLE MACHINE LEARNING ALGORITHM WITHIN A COMPUTER-IMPLEMENTED CROWDSOURCE ENVIRONMENT

(71) Applicant: YANDEX EUROPE AG, Lucerne (CH)

(72) Inventors: Nikita Vitalevich Pavlichenko, Moscow (RU); Valentina Pavlovna Fedorova, Sergiev Posad (RU); Valentin Andreevich Biryukov, Orenburg (RU)

(73) Assignee: Y.E. Hub Armenia LLC, Yerevan (AM)

(*) Notice: Subject to any disclaimer, the term of this patent is extended or adjusted under 35 U.S.C. 154(b) by 817 days.

(21) Appl. No.: 17/670,662

(22) Filed: Feb. 14, 2022

(65) Prior Publication Data
US 2022/0374770 A1    Nov. 24, 2022

(30) Foreign Application Priority Data
May 24, 2021  (RU) ............................... 2021114640

(51) Int. Cl.
*G06N 20/00*   (2019.01)
*G06V 10/764*  (2022.01)
(Continued)

(52) U.S. Cl.
CPC ........... *G06N 20/00* (2019.01); *G06V 10/764* (2022.01); *G06V 10/774* (2022.01); *G06V 10/776* (2022.01)

(58) Field of Classification Search
CPC .... G06N 20/00; G06V 10/776; G06V 10/764; G06V 10/774
See application file for complete search history.

(56) References Cited

U.S. PATENT DOCUMENTS

| 6,560,597 B1 | 5/2003 | Dhillon et al. |
| 7,366,705 B2 | 4/2008 | Zeng et al. |

(Continued)

FOREIGN PATENT DOCUMENTS

| CN | 103914478 A | 7/2014 |
| CN | 104463424 A | 3/2015 |

(Continued)

OTHER PUBLICATIONS

Zhiyao Li, et al., A unified task recommendation strategy for realistic mobile crowdsourcing system, Theoretical Computer Science, vol. 857, 2021, pp. 43-58, ISSN 0304-3975, https://doi.org/10.1016/j.tcs.2020.12.034, (https://www.sciencedirect.com/science/article/pii/S030439752030757X) (Year: 2021).*

(Continued)

*Primary Examiner* — Barbara M Level
(74) *Attorney, Agent, or Firm* — BCF LLP

(57) ABSTRACT

Non-limiting embodiments of the present technology are directed to a method and system for generating a training dataset. The method comprises: accessing data associated with a plurality of assessors executing digital tasks of a first type and digital tasks of a second type; generating, a first ranked list of assessors and a second ranked list of assessors based on their past performance; for a given one of the plurality of assessors: generating, a class score for the common class of digital tasks; acquiring a request for executing a digital task of a third type; ranking, the plurality of assessors based on respective class scores, the given one from the plurality of assessors being one of top ranked ones from the plurality of assessors; transmitting the digital task of the third type to the given one; generating the training data for the MLA based on a response from the given one.

14 Claims, 5 Drawing Sheets

(51) Int. Cl.
*G06V 10/774* (2022.01)
*G06V 10/776* (2022.01)

(56) References Cited

U.S. PATENT DOCUMENTS

| | | | |
|---|---|---|---|
| 7,693,738 B2 | 4/2010 | Guinta et al. | |
| 7,747,083 B2 | 6/2010 | Tawde et al. | |
| 8,266,130 B2 | 9/2012 | Jones et al. | |
| 8,356,057 B2 | 1/2013 | Greenshpan et al. | |
| 8,498,892 B1 | 7/2013 | Cohen et al. | |
| 8,554,605 B2 | 10/2013 | Oleson et al. | |
| 8,626,545 B2 | 1/2014 | Van et al. | |
| 9,268,766 B2 | 2/2016 | Bekkerman | |
| 9,330,071 B1 | 5/2016 | Ahmed et al. | |
| 9,584,540 B1 | 2/2017 | Chan et al. | |
| 9,594,944 B2 | 3/2017 | Kompalli et al. | |
| 9,767,419 B2 | 9/2017 | Venanzi et al. | |
| 9,911,088 B2 | 3/2018 | Nath et al. | |
| 10,061,848 B2 | 8/2018 | Basu et al. | |
| 10,074,200 B1 | 9/2018 | Yeturu | |
| 10,095,688 B1 | 10/2018 | Schilling et al. | |
| 10,162,734 B1 | 12/2018 | Podgorny et al. | |
| 10,192,180 B2 | 1/2019 | Prabhakara et al. | |
| 10,445,671 B2 | 10/2019 | Dubey et al. | |
| 10,685,329 B2 | 6/2020 | Taylor et al. | |
| 10,762,430 B2* | 9/2020 | Ehsani | G06F 16/2471 |
| 10,978,056 B1 | 4/2021 | Challa et al. | |
| 11,481,650 B2 | 10/2022 | Bugakova et al. | |
| 11,900,284 B2* | 2/2024 | Cuartero | G06Q 10/06398 |
| 12,148,417 B1* | 11/2024 | Cardella | G10L 15/18 |
| 2002/0032591 A1 | 3/2002 | Mahaffy et al. | |
| 2003/0154181 A1 | 8/2003 | Liu et al. | |
| 2006/0026240 A1 | 2/2006 | Anthony et al. | |
| 2007/0226207 A1 | 9/2007 | Tawde | |
| 2007/0260601 A1 | 11/2007 | Thompson et al. | |
| 2008/0027913 A1 | 1/2008 | Chang et al. | |
| 2008/0120129 A1 | 5/2008 | Seubert et al. | |
| 2009/0204470 A1 | 8/2009 | Weyl et al. | |
| 2010/0153156 A1 | 6/2010 | Guinta et al. | |
| 2010/0293026 A1 | 11/2010 | Vojnovic et al. | |
| 2011/0173183 A1 | 7/2011 | Dasdan et al. | |
| 2011/0313801 A1 | 12/2011 | Biewald et al. | |
| 2012/0005131 A1 | 1/2012 | Horvitz et al. | |
| 2012/0130934 A1* | 5/2012 | Brillhart | G06N 5/022 706/46 |
| 2012/0131572 A1 | 5/2012 | Shae et al. | |
| 2012/0150579 A1 | 6/2012 | De Wit et al. | |
| 2012/0265573 A1 | 10/2012 | Van et al. | |
| 2013/0006717 A1 | 1/2013 | Oleson et al. | |
| 2013/0029769 A1 | 1/2013 | Lee et al. | |
| 2013/0096968 A1 | 4/2013 | Van Pelt et al. | |
| 2013/0111488 A1 | 5/2013 | Gatti et al. | |
| 2013/0132080 A1 | 5/2013 | Williams et al. | |
| 2013/0159292 A1 | 6/2013 | Larlus et al. | |
| 2013/0231969 A1 | 9/2013 | Van et al. | |
| 2013/0317871 A1 | 11/2013 | Kulkarni et al. | |
| 2014/0122188 A1 | 5/2014 | Van Pelt et al. | |
| 2014/0172767 A1 | 6/2014 | Chen et al. | |
| 2014/0211044 A1 | 7/2014 | Lee et al. | |
| 2014/0214709 A1 | 7/2014 | Greaney et al. | |
| 2014/0229413 A1 | 8/2014 | Dasgupta et al. | |
| 2014/0278634 A1 | 9/2014 | Horvitz et al. | |
| 2014/0321737 A1 | 10/2014 | Movellan et al. | |
| 2014/0343984 A1 | 11/2014 | Shahabi et al. | |
| 2014/0355835 A1 | 12/2014 | Rodriguez-Serrano et al. | |
| 2015/0004465 A1 | 2/2015 | Basu et al. | |
| 2015/0074033 A1 | 3/2015 | Shah et al. | |
| 2015/0086072 A1 | 3/2015 | Kompalli et al. | |
| 2015/0178659 A1 | 6/2015 | Dai et al. | |
| 2015/0186784 A1* | 7/2015 | Barborak | G06N 5/04 706/11 |
| 2015/0186951 A1 | 7/2015 | Wilson et al. | |
| 2015/0193695 A1 | 7/2015 | Cruz Mota et al. | |
| 2015/0213392 A1 | 7/2015 | Kittur et al. | |
| 2015/0254593 A1 | 9/2015 | Ramos et al. | |
| 2015/0254596 A1 | 9/2015 | Nayar et al. | |
| 2015/0254785 A1 | 9/2015 | Yang et al. | |
| 2015/0262111 A1 | 9/2015 | Yu et al. | |
| 2015/0317582 A1 | 11/2015 | Nath et al. | |
| 2015/0332188 A1 | 11/2015 | Yankelevich et al. | |
| 2015/0347519 A1 | 12/2015 | Hornkvist et al. | |
| 2015/0356488 A1 | 12/2015 | Eden et al. | |
| 2015/0356489 A1 | 12/2015 | Kazai et al. | |
| 2015/0363741 A1 | 12/2015 | Chandra et al. | |
| 2016/0034840 A1 | 2/2016 | Venanzi et al. | |
| 2016/0041849 A1 | 2/2016 | Naveh et al. | |
| 2016/0100000 A1 | 4/2016 | Dey et al. | |
| 2016/0132815 A1 | 5/2016 | Itoko et al. | |
| 2016/0140477 A1 | 5/2016 | Karanam et al. | |
| 2016/0162478 A1* | 6/2016 | Blassin | G06Q 10/063112 706/12 |
| 2016/0162837 A1* | 6/2016 | Muntés Mulero | G06Q 10/103 705/301 |
| 2016/0180279 A1 | 6/2016 | Koerner et al. | |
| 2016/0210570 A1 | 7/2016 | Lee et al. | |
| 2016/0232221 A1 | 8/2016 | McCloskey et al. | |
| 2016/0342692 A1 | 11/2016 | Bennett et al. | |
| 2016/0035785 A1 | 12/2016 | Fan et al. | |
| 2017/0011077 A1 | 1/2017 | Kypreos et al. | |
| 2017/0011328 A1* | 1/2017 | Zhao | G06Q 10/06 |
| 2017/0024931 A1 | 1/2017 | Sheffer et al. | |
| 2017/0046794 A1 | 2/2017 | Shukla et al. | |
| 2017/0052761 A1 | 2/2017 | Gunshor et al. | |
| 2017/0061341 A1 | 3/2017 | Haas et al. | |
| 2017/0061356 A1 | 3/2017 | Haas et al. | |
| 2017/0061357 A1 | 3/2017 | Dubey et al. | |
| 2017/0076715 A1 | 3/2017 | Ohtani et al. | |
| 2017/0103451 A1 | 4/2017 | Alipov et al. | |
| 2017/0154313 A1 | 6/2017 | Duerr et al. | |
| 2017/0161477 A1* | 6/2017 | Liu | G06N 7/01 |
| 2017/0185944 A1 | 6/2017 | Volkov et al. | |
| 2017/0200101 A1 | 7/2017 | Kumar et al. | |
| 2017/0220973 A1 | 8/2017 | Byham et al. | |
| 2017/0228749 A1 | 8/2017 | Larvol et al. | |
| 2017/0293859 A1 | 10/2017 | Gusev et al. | |
| 2017/0309193 A1 | 10/2017 | Joseph et al. | |
| 2017/0323211 A1 | 11/2017 | Bencke et al. | |
| 2017/0353477 A1 | 12/2017 | Faigon et al. | |
| 2017/0364810 A1 | 12/2017 | Gusev et al. | |
| 2017/0372225 A1 | 12/2017 | Foresti et al. | |
| 2018/0005077 A1 | 1/2018 | Wang et al. | |
| 2018/0143980 A1 | 5/2018 | Tanikella et al. | |
| 2018/0144283 A1 | 5/2018 | Freitas et al. | |
| 2018/0144654 A1 | 5/2018 | Olsen | |
| 2018/0196579 A1 | 7/2018 | Standefer et al. | |
| 2018/0285176 A1 | 10/2018 | Mozhaev et al. | |
| 2018/0293325 A1 | 10/2018 | Manickavasagam | |
| 2018/0331897 A1 | 11/2018 | Zhang et al. | |
| 2018/0357286 A1 | 12/2018 | Wang et al. | |
| 2019/0095801 A1 | 3/2019 | Saillet et al. | |
| 2019/0114320 A1* | 4/2019 | Patwardhan | G06F 40/289 |
| 2019/0138174 A1 | 5/2019 | Deets, Jr. et al. | |
| 2019/0258985 A1 | 8/2019 | Guastella et al. | |
| 2019/0266289 A1 | 8/2019 | Bartholomew | |
| 2019/0318291 A1 | 10/2019 | Diriye et al. | |
| 2019/0392547 A1 | 12/2019 | Katouzian et al. | |
| 2020/0027052 A1 | 1/2020 | Aiyer | |
| 2020/0089684 A1 | 3/2020 | Gotmanov et al. | |
| 2020/0175383 A1 | 6/2020 | Blumenfeld et al. | |
| 2020/0327582 A1 | 10/2020 | Fedorova et al. | |
| 2020/0364282 A1 | 11/2020 | Kent et al. | |
| 2020/0372338 A1 | 11/2020 | Woods et al. | |
| 2020/0380410 A1 | 12/2020 | Drutsa | |
| 2021/0042530 A1* | 2/2021 | Kim | G06V 20/46 |
| 2021/0073596 A1 | 3/2021 | Bezzubtseva et al. | |
| 2021/0133606 A1 | 5/2021 | Bugakova et al. | |
| 2022/0277362 A1* | 9/2022 | Prendki | G06Q 10/0639 |
| 2022/0292432 A1* | 9/2022 | Biryukov | G06V 10/82 |
| 2024/0370793 A1* | 11/2024 | Smith | G06Q 10/063116 |

FOREIGN PATENT DOCUMENTS

| | | |
|---|---|---|
| CN | 105608318 A | 5/2016 |
| CN | 106203893 A | 12/2016 |

(56) References Cited

FOREIGN PATENT DOCUMENTS

| | | | |
|---|---|---|---|
| CN | 106327090 A | 1/2017 |
| CN | 106446287 A | 2/2017 |
| CN | 106557891 A | 4/2017 |
| CN | 107767055 A | 3/2018 |
| CN | 107767058 A | 3/2018 |
| CN | 107909262 A | 4/2018 |
| CN | 104794573 B | 5/2018 |
| CN | 109272003 A | 1/2019 |
| CN | 109376237 A | 2/2019 |
| CN | 109522545 A | 3/2019 |
| CN | 109544504 A | 3/2019 |
| CN | 109670727 A | 4/2019 |
| CN | 110020098 A | 7/2019 |
| CN | 110503396 A | 11/2019 |
| CN | 110909880 A | 3/2020 |
| CN | 110928764 A | 3/2020 |
| CN | 111191952 A | 5/2020 |
| CN | 111291973 A | 6/2020 |
| CN | 111723930 A | 9/2020 |
| CN | 109271537 B | 11/2021 |
| EP | 3438897 A1 | 2/2019 |
| KR | 102155790 B1 | 9/2020 |
| KR | 102156582 B1 | 9/2020 |
| RU | 2632143 C1 | 10/2017 |
| RU | 2672171 C1 | 11/2018 |
| RU | 2717787 C1 | 3/2020 |
| RU | 2744032 C2 | 3/2021 |
| RU | 2744038 C2 | 3/2021 |
| WO | 0010296 A2 | 2/2000 |
| WO | 2017116931 A2 | 7/2017 |
| WO | 2017222738 A1 | 12/2017 |
| WO | 2019200780 A1 | 10/2019 |

OTHER PUBLICATIONS

Karim et al. Learn or Earn? Intelligent Task Recommendations for Competitive Crowdsourced Software Development, Proceedings of the 51st Hawaii International Conference on System Sciences, 2018, pp. 5604-5613, URI: http://hdl.handle.net/10125/50589 ISBN: 978-0-9981331-1-9. (Year: 2018).*
Vaibhav B. Sinha et al., "Fast Dawid-Skene: A Fast Vote Aggregation Scheme for Sentiment Classification", Department of Computer Science and Engineering, Indian Institute of Technology Hyderabad, Telangana, Sep. 7, 2018; https://arxiv.org/abs/1803.02781.
Hongwei Li et al., "Error Rate Bounds in Crowdsourcing Models", Department of Statistics, UC Berkeley, Department of EECS, UC Berkeley and Microsoft Research, Redmond, Jul. 10, 2013. https://arxiv.org/pdf/1307.2674.pdf.
Hongwei Li et al., "Error Rate Bounds and Iterative Weighted Majority Voting for Crowdsourcing", University of California, Berkeley, Nov. 15, 2014; https://arxiv.org/pdf/1411.4086.pdf.
Hideaki et al., "Analysis of Minimax Error Rate for Crowdsourcing and Its Application to Worker Clustering Model", https://arxiv.org/pdf/1802.04551.pdf Jun. 9, 2018.
Changbo et al., "Online Crowdsourcing", https://arxiv.org/abs/1512.02393, Submitted on Dec. 8, 2015 (v1), last revised Feb. 8, 2019 (this version, v2).
Vikas et al., "Eliminating Spammers and Ranking Annotators for Crowdsourced Labeling Tasks", Journal of Machine Learning Research 13 (2012) 491-518 ; http://www.jmlr.org/papers/volume13/raykar12a/raykar12a.pdf.
Feldman et al., "Behavior-Based Quality Assurance in Crowdsourcing Markets", Zurich Open Repository and Archive, University of Zurich, 2014. https://www.zora.uzh.ch/id/eprint/98779/1/Feldman.pdf.
Lease, "On Quality Control and Machine Learning in Crowdsourcing", School of Information, University of Texas at Austin; 2011, https://www.ischool.utexas.edu/~ml/papers/lease-hcomp11.pdf.
Gadiraju, "Understanding Malicious Behavior in Crowdsourcing Platforms: The Case of Online Surveys", http://eprints.whiterose.ac.uk/95877/1/Understanding%20malicious%20behaviour.pdf; 2015 https://doi.org/10.1145/2702123.2702443.
Carsten Eickhoff, "Cognitive Biases in Crowdsourcing", Dept. of Computer Science, Zurich, Switzerland, 2018, https://brown.edu/Research/AI/files/pubs/wsdm18.pdf.
ECE Kamar, "Identifying and Accounting for Task-Dependent Bias in Crowdsourcing", Microsoft Research, Redmond, WA, USA, 2015. http://erichorvitz.com/hcomp_2015_learning_bias.pdf.
D. Sánchez-Charles, "Worker ranking determination in crowdsourcing platforms using aggregation functions," 2014 IEEE International Conference on Fuzzy Systems (FUZZ-IEEE), Beijing, 2014, pp. 1801-1808.
Khazankin, "QOS-Based Task Scheduling in Crowdsourcing Environments", Distributed Systems Group, Vienna University of Technology, Argentinierstrasse 8/184-1, A-1040 Vienna, Austria, 2011.
Yuen, "Task recommendation in crowdsourcing systems", Crowdkdd '12 Proceedings of the First International Workshop on Crowdsourcing and Data Mining, pp. 22-26, Beijing, China, Aug. 2012.
Ustalov "Towards the Automated Collaborative Process for Language Resource Construction", Inzhenernyy vestnik Dona Journal, Issue No. 1(48), Published Mar. 20, 2018.
Yu, "Software Crowdsourcing Task Allocation Algorithm Based on Dynamic Utility", IEEE Access ( vol. 7) pp. 33094-33106, Published Mar. 13, 2019.
Huang, "Enhancing reliability using peer consistency evaluation in human computation". Published Mar. 18, 2013 in CSCW 2013— Proceedings of the 2013 ACM Conference on Computer Supported Cooperative Work (pp. 639-647). (Proceedings of the ACM Conference on Computer Supported Cooperative Work, CSCW). https://doi.org/10.1145/2441776.2441847.
Qiu, "CrowdEval: A Cost-Efficient Strategy to Evaluate Crowdsourced Worker's Reliability", AAMAS '18: Proceedings of the 17th International Conference on Autonomous Agents and MultiAgent Systems, Jul. 2018, pp. 1486-1494.
Hung, "An Evaluation of Aggregation Techniques in Crowdsourcing", Web Information Systems Engineering—WISE 2013, 2013, vol. 8181, ISBN : 978-3-642-41153-3.
Office Action issued in respect of the related U.S. Appl. No. 16/852,512.
P. Radha et al. "An EREC framework for e-contract modeling, enactment and monitoring", published on Oct. 2004, Data & Knowledge Engineering, vol. 51, Issue 1, pp. 31-58, https://doi.org/10.1016/j.datak.2004.03.006.
Thorsten et al. "A Collaborative Document Management Environment for Teaching and Learning", published on Jan. 2000, CVE, San Francisco, pp. 197-198 DOI:10.1145/351006.351044.
Office Action issued on May 12, 2022 in respect of the related U.S. Appl. No. 16/832,095.
Notice of Allowance dated May 16, 2022 received in respect of a related U.S. Appl. No. 16/777,790.
Notice of Allowance issued on Jun. 1, 2022 in respect of the related U.S. Appl. No. 16/503,977.
Li et al.,"Crowdsourced Data Management: A Survey", Published on Apr. 19, 2017, IEEE Transactions on Knowledge and Data Engineering, pp. 1-23, DOI:10.1109/ICDE.2017.26.
Federova et al.,"Latent Distribution Assumption for Unbiased and Consistent Consensus Modelling", Published on Jun. 20, 2019, arXiv:1906.08776v1.
Bugakova et al.,"Aggregation of pairwise comparisons with reduction of biases", Published on Jun. 9, 2019, arXiv:1906.03711v1.
Simpson et al., "Scalable Bayesian Preference Learning for Crowds", Published on Dec. 11, 2019 arXiv:1912.01987v2.
Notice of Allowance dated Jun. 2, 2022 received in respect of a related U.S. Appl. No. 16/906,074.
Office Action issued on Sep. 20, 2023 in respect of the related U.S. Appl. No. 17/239,467.
Russian Search Report dated Mar. 22, 2024 issued in respect of the counterpart Russian Patent Application No. 2021106657.
Russian Search Report dated Aug. 23, 2024 issued in respect of the counterpart Russian Patent Application No. 2022129234.

(56) References Cited

OTHER PUBLICATIONS

Russian Search Report dated Jan. 18, 2024 issued in respect of the counterpart Russian Patent Application No. 2021127059.
Russian Search Report dated Oct. 4, 2024 issued in respect of the related Russian Patent Application No. 2023105639.
Chittilappilly et al.,"A Survey of General-Purpose Crowdsourcing Techniques", Published on Sep. 1, 2016, IEEE Transactions on Knowledge and Data Engineering, vol. 28, Issue: 9, pp. 2246-2266 (Year: 2016).
Notice of Allowance dated Aug. 31, 2022 received in respect of a related U.S. Appl. No. 16/852,512.
Hettiachchi et al.,"A Survey on Task Assignment in Crowdsourcing", Published on Nov. 15, 2021, pp. 1-36, https://arxiv.org/pdf/2111.08501.pdf.
List et al.,"An Evaluation of Conceptual Business Process Modelling Languages", Published on Apr. 23, 2006, SAC'06, pp. 1532-1539, https://doi.org/10.1145/1141277.1141633.
Schnitzer et al.,"Demands on task recommendation in crowdsourcing platforms—the worker's perspective", Sep. 2015, Crowd Rec 19, 2015, pp. 1-6.
Notice of Allowance dated Feb. 15, 2023 received in respect of a related U.S. Appl. No. 16/832,095.
Sajadmanesh et al.,"NP-GLM: A Non-Parametric Method for Temporal Link Prediction", Published on Jun. 21, 2017, Department of Computer Engineering, Sharif University of Technology, Tehran, Iran, pp. 1-7.
Office Action dated Apr. 12, 2023 received in respect of a related U.S. Appl. No. 17/239,467.

\* cited by examiner

112-1

| Class | Type | Difficulty | Success% |
|---|---|---|---|
| A | A-1 | hard | 90 |
| | | medium | 91 |
| | | easy | 93 |
| | A-2 | medium | 90 |
| | | easy | 95 |
| B | B-1 | hard | 85 |
| | | easy | 87 |
| ... | ... | ... | ... |

↑202  ↑204  ↑206  ↑208

112-2

| Class | Type | Difficulty | Success% |
|---|---|---|---|
| A | A-1 | easy | 100 |
| | A-2 | hard | 70 |
| | | easy | 90 |
| B | B-1 | hard | 85 |
| | | medium | 89 |
| | B-2 | easy | 90 |
| | | medium | 70 |
| ... | ... | ... | ... |

METHODS AND SYSTEMS FOR GENERATING TRAINING DATA FOR COMPUTER-EXECUTABLE MACHINE LEARNING ALGORITHM WITHIN A COMPUTER-IMPLEMENTED CROWDSOURCE ENVIRONMENT

CROSS-REFERENCE

The present application claims priority to Russian Patent Application No. 2021114640, entitled "Methods and Systems for Generating Training Data for Computer-Executable Machine Learning Algorithm Within a Computer-Implemented Crowdsource Environment", filed May 24, 2021, the entirety of which is incorporated herein by reference.

FIELD

The present technology relates to methods and systems generating training data for a computer-executable machine learning algorithm (MLA), or more specifically, generating training data based on one or more digital tasks accessible by a plurality of assessors within a computer-implemented crowdsource environment.

BACKGROUND

Crowdsourcing platforms, such as the Amazon Mechanical Turk™, make it possible to coordinate the use of human intelligence to perform tasks that computers are currently unable, in a shorter time and at a lower cost, compared to that needed by professional assessors.

Generally speaking, a crowdsourcing platform operates in a two-sided market ecosystem of requesters who post jobs known as Human Intelligence Tasks (HITs), and users who complete them in exchange for a monetary payment set by the requesters. The key goal of this two-sided market platform is to improve the experience of each side of the market and to make effective matching of their needs.

United States Patent Application Publication No. 2016/100000 A1 published Apr. 7, 2016, to Hewlett Packard Enterprise Development LP, and titled "Result Aggregation", discloses methods and systems for result aggregation in crowdsourcing are described. In one implementation, a task with a plurality of solution options is provided for workers to respond. Responses for the task are received from multiple workers, where each of the responses includes a worker response confidence value corresponding to one of the plurality of solution options. The worker response confidence value is indicative of confidence of a worker for the one of the plurality of solution options to be correct. A task answer for the task is estimated based on at least the worker response confidence value received from each of the multiple workers. A performance bonus for each of the multiple workers is computed based on the task answer, the worker response confidence value in the response from each worker, and a Proper Scoring Rule.

United States Patent Application Publication No. 2017/372225 A1 published Dec. 28, 2017, to Microsoft Technology Licensing LLC, and titled "Targeting Content to Underperforming Users in Clusters", discloses a method that includes obtaining individual behavior data of a target user and crowd behavior data of other users, and executing a machine learning algorithm to determine performance benchmarks for tasks based on the crowd behavior data. The method further includes aggregating the other users into a plurality of user clusters, classifying the target user into one of the clusters, identifying one or more focus features of the target user that underperform at least one benchmark of the one or more features of the plurality of users in the user cluster to which the target user is classified, identify targeted content associated with the one or more tasks or chains of tasks based on the one or more identified features of the target user, and deliver the targeted content via the computing device.

SUMMARY

Non-limiting embodiments of the present technology have been developed based on developer's appreciation of at least one technical shortcomings over at least some of the prior art solutions.

Firstly, the correctness of the outputs of the tasks performed by human assessors has an impact on training, and eventually on the in-use performance, of a number of machine learning algorithms. If training data includes a large number of erroneous training examples (i.e. training examples with erroneous labels), the in-use performance of a machine learning algorithm trained based on this training data will suffer. Secondly, the efficiency of data labelling by human assessors has an impact on monetary resources required for compensating the human assessors. If tasks are allocated to human assessors that are not well-suited for performing said tasks, not only that the data may be erroneous, but the operator of the crowdsourcing platform will need to allocate additional monetary resources for having a pre-determined number of correctly executed tasks.

Developers of the present technology have realized that determining a productivity rate of a given user for a given task may be easily made with an acceptable accuracy by analyzing previously completed tasks of a similar type by the given user. In other words, if the given user has successfully completed similar tasks to the given task, it would be safe assume that the given task would be completed at similar accuracy.

However, in the case where the user is provided with a new type of task that the user has not yet worked on, determining the productivity rate is much more challenging.

In developing the present technology, the developers have realized that for any given user, it is possible to infer the productivity rate for an unknown type of task based on previously executed tasks of different type.

In accordance with a first broad aspect of the present technology, there is disclosed a computer-implemented method of generating training data for a computer-executable Machine Learning Algorithm (MLA), the training data being based on one or more digital tasks accessible by a plurality of a assessors within a computer-implemented crowdsource environment, the method being executable by a server accessible over a communication network by electronic devices associated with the plurality of assessors, the method comprising: accessing, by the server, assessor data associated with the plurality of assessors, the assessor data including information indicative of past performance of respective ones from the plurality of assessors when executing digital tasks of a first type and digital tasks of a second type, the digital tasks of the first type and the digital tasks of the second type being digital tasks of a common class of digital tasks; generating, by the server, a first ranked list of assessors based on their past performance when executing the digital tasks of the first type; generating, by the server, a second ranked list of assessors based on their past performance when executing the digital tasks of the second type; for a given one of the plurality of assessors: generating, by the server, a first score for the digital tasks of the first type using the first ranked list of assessors, the first score being indicative of a past performance of the given one of the plurality of assessors when executing the digital tasks of the first type relative to the past performance of other ones from the plurality of assessors when executing the digital tasks of the first type; generating, by the server, a second score for the digital tasks of the second type using the second ranked list of assessors, the second score being indicative of a past performance of the given one of the plurality of assessors when executing the digital tasks of the second type relative to the past performance of other ones from the plurality of assessors when executing the digital tasks of the second type; generating, by the server, a class score for the common class of digital tasks as a combination of the first score and the second score; acquiring, by the server, a request for executing a digital task of a third type being different from the first type and the second type; ranking, by the server, the plurality of assessors based on respective class scores for the common class of digital tasks, the given one from the plurality of assessors being one of top ranked ones from the plurality of assessors; transmitting, by the server over the communication network, the digital task of the third type to the electronic device associated with the given one from the plurality of assessors; generating, by the server, the training data for the MLA based on a response from the given one from the plurality of assessors executing the digital task of the third type.

In some non-limiting embodiments of the method, the digital task of the third type being a digital task of the common class of digital tasks.

In some non-limiting embodiments of the method, the common class is a first class, and the digital task of the third type being a digital task of a second class.

In some non-limiting embodiments of the method, the method further comprises, for the given one of the plurality of assessors: generating, by the server, a fourth score for the digital tasks of a fourth type, the fourth type being a digital task of a third class; generating a class score for the third class; and ranking the plurality of assessors comprises ranking the plurality of assessors based on the class score of the first class and the class score of the third class.

In some non-limiting embodiments of the method, the common class is an image classification class, a given digital tasks of the first type being image classification of a first type of objects, a given digital tasks of the second type being image classification of a second type of objects, a given digital tasks of the third type being image classification of a third type of objects.

In some non-limiting embodiments of the method, the class score is a proxy for comparing (i) the past performance of the given one of the plurality of assessors when executing digital tasks of all types from the common class against (ii) past performance of another given one of the plurality of assessors when executing digital tasks of all types from the common class.

In some non-limiting embodiments of the method, the past performance of the given one of the plurality of assessors when executing digital tasks is a ratio of a number of correctly executed digital tasks by the given one of the plurality of assessors over a total number of digital tasks executed by the given one of the plurality of assessors.

In some non-limiting embodiments of the method, the first score is a first percentile score for the past performance of the given one of the plurality of assessors relative to the past performance of other ones from the plurality of assessors when executing the digital tasks of the first type.

In some non-limiting embodiments of the method, the second score is a second percentile score for the past performance of the given one of the plurality of assessors relative to the past performance of other ones from the plurality of assessors when executing the digital tasks of the second type.

In accordance with another broad aspect of the present technology, there is disclosed a system for generating training data for a computer-executable machine learning algorithm (MLA), the data being based on one or more digital tasks accessible by a plurality of a assessors within a computer-implemented crowdsource environment, the system comprising a server accessible over a communication network by electronic devices associated with the plurality of assessors, the server comprising a processor configured to: access assessor data associated with the plurality of assessors, the assessor data including information indicative of past performance of respective ones from the plurality of assessors when executing digital tasks of a first type and digital tasks of a second type, the digital tasks of the first type and the digital tasks of the second type being digital tasks of a common class of digital tasks; generate a first ranked list of assessors based on their past performance when executing the digital tasks of the first type; generate a second ranked list of assessors based on their past performance when executing the digital tasks of the second type; for a given one of the plurality of assessors: generate a first score for the digital tasks of the first type using the first ranked list of assessors, the first score being indicative of a past performance of the given one of the plurality of assessors when executing the digital tasks of the first type relative to the past performance of other ones from the plurality of assessors when executing the digital tasks of the first type; generate a second score for the digital tasks of the second type using the second ranked list of assessors, the second score being indicative of a past performance of the given one of the plurality of assessors when executing the digital tasks of the second type relative to the past performance of other ones from the plurality of assessors when executing the digital tasks of the second type; generate a class score for the common class of digital tasks as a combination of the first score and the second score; acquire a request for executing a digital task of a third type being different from the first type and the second type; rank the plurality of assessors based on respective class scores for the common class of digital tasks, the given one from the plurality of assessors being one of top ranked ones from the plurality of assessors; transmit over the communication network, the digital task of the third type to the electronic device associated with the given one from the plurality of assessors; generate the training data for the MLA based on a response from the given one from the plurality of assessors executing the digital task of the third type.

In some non-limiting embodiments of the system, the digital task of the third type being a digital task of the common class of digital tasks.

In some non-limiting embodiments of the system, the common class is a first class, and the digital task of the third type being a digital task of a second class.

In some non-limiting embodiments of the system, the processor is further configured to execute, for the given one of the plurality of assessors: generate a fourth score for the digital tasks of a fourth type, the fourth type being a digital task of a third class; generate a class score for the third class; and rank the plurality of assessors comprises ranking the plurality of assessors based on the class score of the first class and the class score of the third class.

In some non-limiting embodiments of the system, the common class is an image classification class, a given digital tasks of the first type being image classification of a first type of objects, a given digital tasks of the second type being image classification of a second type of objects, a given digital tasks of the third type being image classification of a third type of objects.

In some non-limiting embodiments of the system, the class score is a proxy for comparing (i) the past performance of the given one of the plurality of assessors when executing digital tasks of all types from the common class against (ii) past performance of an other given one of the plurality of assessors when executing digital tasks of all types from the common class.

In some non-limiting embodiments of the system, the past performance of the given one of the plurality of assessors when executing digital tasks is a ratio of a number of correctly executed digital tasks by the given one of the plurality of assessors over a total number of digital tasks executed by the given one of the plurality of assessors.

In some non-limiting embodiments of the system, the first score is a first percentile score for the past performance of the given one of the plurality of assessors relative to the past performance of other ones from the plurality of assessors when executing the digital tasks of the first type.

In some non-limiting embodiments of the system, the second score is a second percentile score for the past performance of the given one of the plurality of assessors relative to the past performance of other ones from the plurality of assessors when executing the digital tasks of the second type.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2 depicts a schematic illustration of a performance data and a second performance data of the system of FIG. 1.

DETAILED DESCRIPTION

Figure 1:
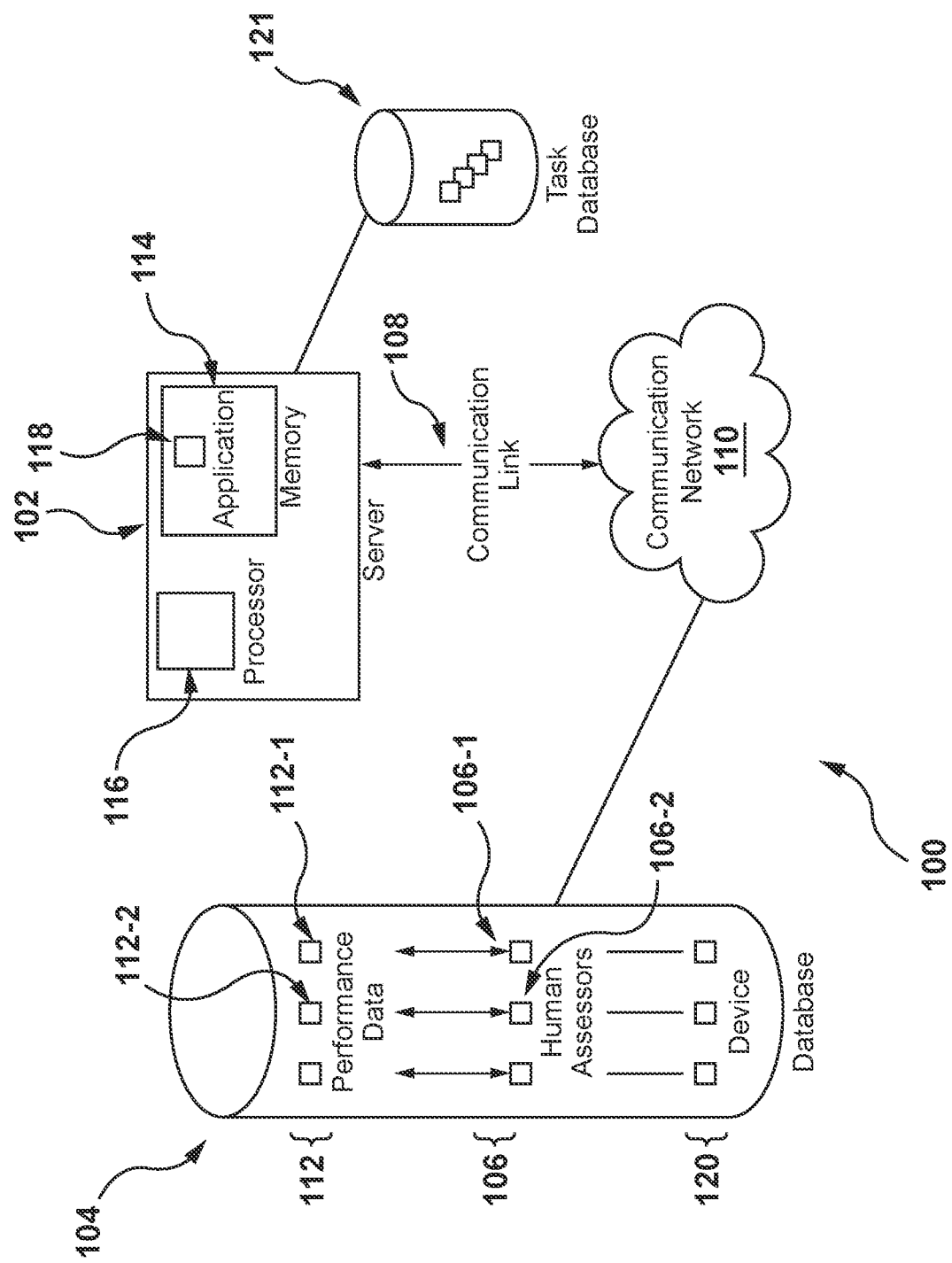
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. Thus, the system 100 is an example of a computer-implemented crowdsourced environment 100.

It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represents conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises a server 102 and a database 104 accessible by the server 102.

As schematically shown in FIG. 1, the database 104 comprises an indication for each one of the identity of a plurality of human assessor 106, who have indicated their availability for completing at least one crowdsourced task. The plurality of human assessor 106 includes a first human assessor 106-1 and a second human assessor 106-2. Needless to say, although only three human assessors are shown within the database 104, this is done for ease of illustration, and it should be understood that the database 104 may store an indication of more or less than 3 human assessors.

In some non-limiting embodiments of the present technology, the database 104 is under control and/or management of a provider of crowdsourced services, such as Yandex LLC of Lev Tolstoy Street, No. 16, Moscow, 119021, Russia. In alternative non-limiting embodiments of the present technology, the database 104 can be operated by a different entity.

The implementation of the database 104 is not particularly limited and, as such, the database 104 could be implemented using any suitable known technology, as long as the functionality described in this specification is provided for. In accordance with the non-limiting embodiments of the present technology, the database 104 comprises (or has access to) a communication interface (not depicted), for enabling two-way communication with a communication network 110.

In some non-limiting embodiments of the present technology, the communication network 110 can be implemented as the Internet. In other non-limiting embodiments of the present technology, the communication network 110 can be implemented differently, such as any wide-area communication network, local area communications network, a private communications network and the like.

It is contemplated that the database 104 can be stored at least in part at the server 102 and/or be managed at least in part by the server 102. In accordance with the non-limiting embodiments of the present technology, the database 104 comprises sufficient information associated with the identity of the human assessors 106 to allow an entity that has access to the database 104, such as the server 102, to assign and transmit one or more tasks to be completed by one or more of the plurality of human assessor 106.

In accordance with non-limiting embodiments of the present technology, the database 104 stores past performance data 112 associated with each one of the plurality of human assessor 106. For example, a first performance data 112-1 is associated with the first human assessor 106-1, and a second performance data 112-2 is associated with the second human assessor 106-2 and so on.

Referring to FIG. 2, there is depicted a schematic illustration of the first performance data 112-1 (associated with the first human assessor 106-1) and the second performance data 112-2 (associated with the second human assessor 106-2). As noted above, the first performance data 112-1 and the second performance data 112-2 are stored within the database 104. In some non-limiting embodiments, the first performance data 112-1 and the second performance data 112-2 may be stored in a storage device different from the database 104.

In some non-limiting embodiments of the present technology, the past performance data comprises information associated with a previously completed task, such as (i) a class 202 of a previously completed task; (ii) a type 204 of the previously completed task; (iii) a difficulty 206 associated with the type 204, and (iv) a success rate 208 indicative of a ratio of a number of correctly executed tasks over a total number of digital tasks. How the success rate 208 is determined is not limited. In some non-limiting embodiments of the present technology, the success rate 208 may be determined based on one or more "honeypot tasks", which correspond to tasks for which the correct result is known prior to being submitted to the human assessor. Alternatively, or in addition, the success rate 208 may also be based on whether the submitted answer corresponds to a majority of the answers submitted by other human assessors.

In the context of the present technology, the term "type" corresponds to a specific type of task executed by the human assessor that falls under a "class". In other words, more than one type of task can be grouped into a "class" based on the similarity of the types of tasks.

For example, a given class may correspond to translation tasks, which includes a first type of task corresponding to translating a text from a first language (ex. French) to a second language (ex. English), a second type of task corresponding to translating a text from the first language (ex. French) to a third language (ex. German), and so on.

In another example, a given class may correspond to image recognition tasks, which includes a first type of task corresponding to classification (i.e. categorization/classification of an image), a second type of task corresponding to tagging (i.e. assigning one or more tags to a given image), a third type of task corresponding to detection (i.e. identifying an object within a given image), and so on.

In some non-limiting embodiments of the present technology, it is contemplated that some types of task be divided into subtypes. For example, a classification task may be subdivided into a first type of task being image classification of a first type of objects, a second type of task being image classification of a second type of objects, a third type of task being image classification of a third type of objects, and so on. In such embodiments, the classification type corresponds to a class.

Taking the first performance data 112-1 as an example, the first performance data 112-1 is indicative that the first human assessor 106-1 has previously executed 2 classes of tasks (illustrated as "A" and "B"). Moreover, the first human assessor 106-1 previously executed 2 types of tasks associated with the first class "A" (identified as "A-1" and "A-2") and a single type of task associated with the second class "B" (identified as "B-1").

With regards to each specific type 204 previously executed by the first human assessor 106-1, the first performance data 112-1 includes an indication of the difficulty and an associated success rate.

For example, the first human assessor 106-1 has: (i) a success rate of 90% for A-1 type tasks with a difficulty high difficulty, (ii) a success rate of 91% for similar type tasks with a medium difficulty, and (iii) a success rate of 93% of similar type tasks with a low difficulty. Needless to say, although the difficulty is illustrated as hard, medium or easy, it is not limited as such and may be illustrated in any other suitable manner.

Taking a look at the second performance data 112-2, it is noted that the second human assessor 106-2 has previously completed tasks that fall within the same classes (i.e. "A" and "B"), but has also completed tasks of different types and/or difficulty.

For example, the second human assessor 106-2 has previously completed "A-2" task(s) with a highest level of difficulty (whereas the first human assessor 106-1 has not completed the same level of difficulty).

The second human assessor 106-2 has also previously completed "B-2" task(s), whereas the first human assessor 106-1 has only contemplated "B-1" task(s).

Needless to say, it should be understood that the first performance data 112-1 and the second performance data 112-2 are illustrated for the purpose of illustration and in no way are intended to be limiting. It is contemplated that the first performance data 112-1 and the second performance data 112-2 each include more or less classes, types and difficulty.

Returning now to FIG. 1, the server 102 can be implemented as a conventional computer server. In an example of a non-limiting embodiment of the present technology, the server 102 can be implemented as a Dell™ PowerEdge™ Server running the Microsoft Windows Server™ operating system. Needless to say, the server 102 can be implemented in any other suitable hardware and/or software and/or firmware or a combination thereof. In the depicted non-limiting embodiment of the present technology, the server 102 is a single server. In alternative non-limiting embodiments of the present technology, the functionality of the server 102 may be distributed and may be implemented via multiple servers.

The server 102 comprises a communication interface (not depicted) for enabling two-way communication with the communication network 110 via a communication link 108.

How the communication link 108 is implemented is not particularly limited and depends on how the server 102 is implemented. For example, the communication link 108 can be implemented as a wireless communication link (such as, but not limited to, a 3G communications network link, a 4G communications network link, a Wireless Fidelity, or WiFi®, for short, Bluetooth®, or the like) or as a wired communication link (such as an Ethernet based connection).

It should be expressly understood that implementations of the server 102, the communication link 108 and the communication network 110 are provided for illustration purposes only. As such, those skilled in the art will easily appreciate other specific implementational details for the server 102, the communication link 108, and the communication network 110. As such, by no means the examples provided hereinabove are meant to limit the scope of the present technology.

The server 102 comprises a server memory 114, which comprises one or more storage media and generally stores computer-executable program instructions executable by a server processor 116. By way of example, the server memory 114 may be implemented as a tangible computer-readable storage medium including Read-Only Memory (ROM) and/or Random-Access Memory (RAM). The server memory 114 may also include one or more fixed storage devices in the form of, by way of example, hard disk drives (HDDs), solid-state drives (SSDs), and flash-memory cards.

In some non-limiting embodiments of the present technology, the server 102 can be operated by the same entity that operates the database 104. In alternative non-limiting embodiments of the present technology, the server 102 can be operated by an entity different from the one that operates the database 104.

In some non-limiting embodiments of the present technology, the server 102 is configured to execute a crowdsourcing application 118. For example, the crowdsourcing application 118 may be implemented as a crowdsourcing platform such as Yandex.Toloka™ crowdsourcing platform, or other proprietary or commercial crowdsourcing platform.

To that end, the server 102 is communicatively coupled to a task database 121. In alternative non-limiting embodiments of the present technology, the task database 121 may be communicatively coupled to the server 102 via the communication network 110. Although the task database 121 is illustrated schematically herein as a single entity, it is contemplated that the task database 121 may be configured in a distributed manner.

The task database 121 is populated with a plurality of human intelligence tasks (HITs, hereinafter "digital task" or, simply "tasks") (not separately numbered).

How the task database 121 is populated with the plurality of tasks is not limited. Generally speaking, one or more requesters (not shown) may submit one or more tasks to be completed to the crowdsourcing application 118 (which are then stored in the task database 121). In some non-limiting embodiments of the present technology, the one or more requesters may specify the class, the type and the difficulty of the task, and/or a budget to be allocated to a human assessor completing the task(s).

How the tasks are implemented is not limited. In some non-limiting embodiments of the present technology, the task database 121 includes types of tasks previously completed by the first human assessor 106-1 and the second human assessor 106-2 (i.e. the various types illustrated in FIG. 2). In some non-limiting embodiments of the present technology, the task database 121 may also include one or more class of tasks (and types) not previously completed by the first human assessor 106-1 and the second human assessor 106-2.

As has been alluded above, the task database 121 includes tasks that, when submitted to a human assessor, provide instructions to the human assessor for completing the task. The human assessor may input its answer (using a label, text, and the like), which is used by the requester as training data for training a machine learning algorithm.

The server 102 is configured to communicate with various entities via the communication network 110. Examples of the various entities include the database 104, an electronic device 120 associated with each one of the plurality of human assessors 106, and other devices that may be coupled to the communication network 110. Accordingly, the crowdsourcing application 118 is configured to retrieve a given task from the task database 121 and send the given task to the electronic device 120 used by a given human assessor 106 to complete the given task, via the communication network 110 for example. Similarly, in some non-limiting embodiments of the present technology, the server 102 is configured to receive a set of responses to the tasks that has been completed by the human assessor 106.

It is contemplated that any suitable file transfer technology and/or medium could be used for this purpose. It is also contemplated that the task could be submitted to the human assessors 106 via any other suitable method, such as by making the task remotely available to the human assessors 106.

In at least some embodiments of the present technology, it is contemplated that the digital tasks in the task database 121 may comprise data labelling tasks, meaning that the response provided by a given human assessor may be used for determining and/or may be representative of a "label" for a respective dataset. For example, if the given digital task is of the image classification type, and in a sense "tasks" a human assessor to provide a response indicative of whether a given image (dataset) is an image of a dog or of a cat, the response provided by the human assessor may represent a label for the given image and which is indicative of a presence of animal on the given image.

Such data labelling tasks may be used for training a verity of machine learning algorithms. For example, a machine learning algorithm may be any of various conventional machine learning algorithms, including, without limitation, "deep learning" algorithms, other types of neural networks or "connectionist" systems, decision trees, decision forests, Bayesian networks, or other known or later developed machine learning algorithms that use training datasets (e.g., supervised or semi-supervised learning algorithms).

In the example presented immediately above, the given image (dataset) and the response (label) may form a training set for training an image classification algorithm. The image classification algorithm may be trained in a supervised manner by using a large number of training sets generated in a similar manner to what has been described above. In at least one implementations of the present technology, the image classification algorithm may be a particular class of machine learning algorithms, such as a Convolution Neural Network, for example.

Although the description of the system 100 has been made with reference to various hardware entities (such as the database 104, the server 102, the task database 121 and the like) depicted separately, it should be understood that this is done for ease of understanding.

It is contemplated that the various functions executed by these various entities be executed by a single entity or be distributed among different entities.

Crowdsourcing Application 118

Figure 3:
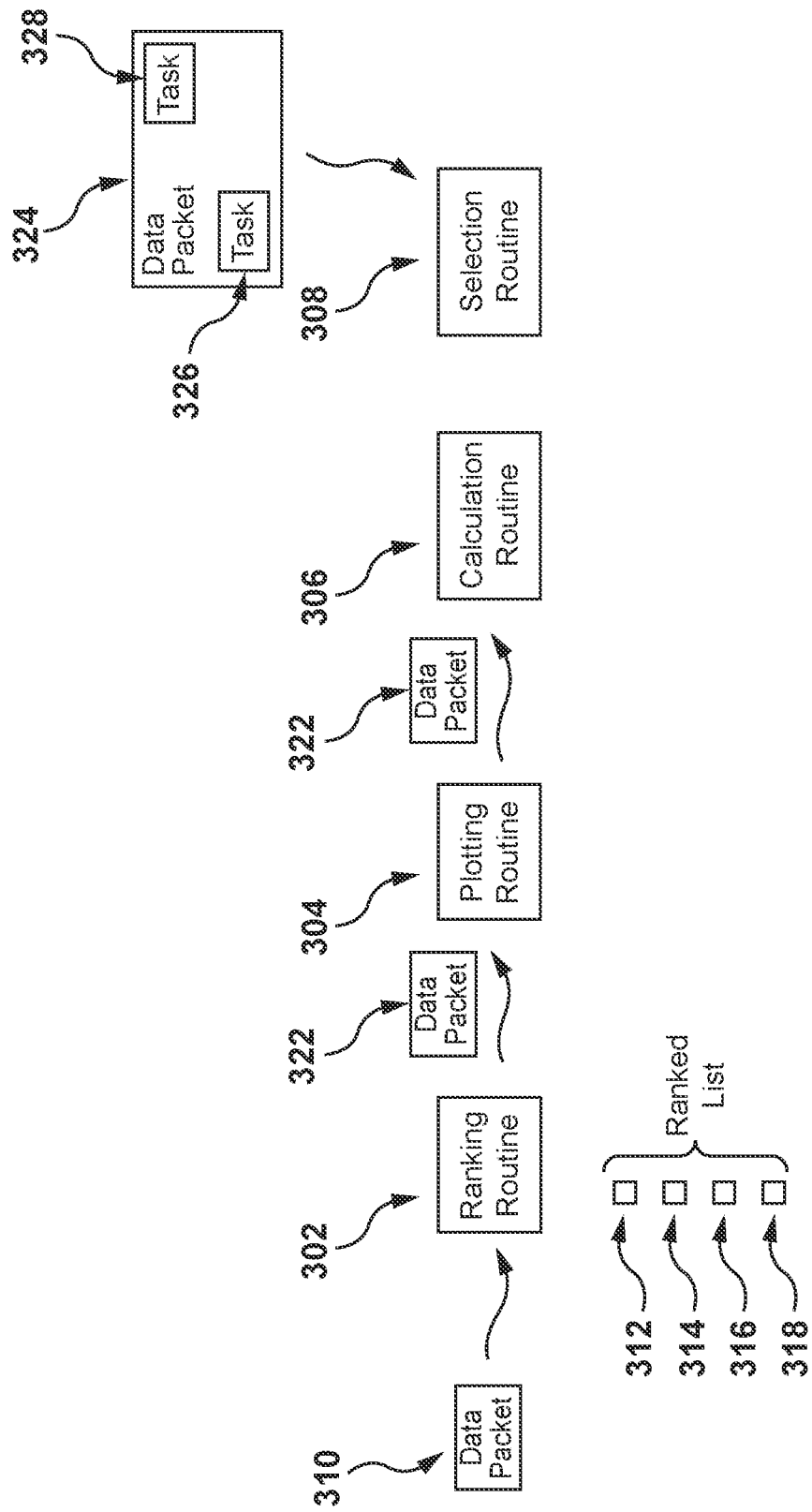
FIG. 3 depicts a schematic diagram of a process, executed by the crowdsourcing application of the system of FIG. 1.

With reference to FIG. 3, there is depicted a schematic diagram of a process, executed by the crowdsourcing application 118, for allocating a given task to one of the plurality of human assessors 106. More specifically, the crowdsourcing application 118 is configured to determine a given one of a human assessor 106 with the highest productivity rate vis-à-vis a given task. For example, the productivity rate may refer to a predicted time required for the human assessor 106 to complete the given task or predicted hourly earnings for the human assessor 106 when completing the given task.

The crowdsourcing application 118 executes (or otherwise has access to): a ranking routine 302, a plotting routine 304, a calculation routine 306, and a selection routine 308.

In the context of the present specification, the term "routine" refers to a subset of the computer executable program instructions of the crowdsourcing application 118 that is executable by the server processor 116 (the ranking routine 302, the plotting routine 304, the calculation routine 306 and the selection routine 308). For the avoidance of any doubt, it should be expressly understood that the ranking routine 302, the plotting routine 304, the calculation routine 306 and the selection routine 308 are illustrated herein as separate entities for ease of explanation of the processes executed by the crowdsourcing application 118. It is contemplated that some or all of the ranking routine 302, the plotting routine 304, the calculation routine 306 and the selection routine 308 may be implemented as one or more combined routines.

For ease of understanding the present technology, functionality of each of the ranking routine 302, the plotting routine 304, the calculation routine 306 and the selection routine 308, as well as data and/or information processed or stored therein are described below.

The following description of the functionality of each one of the ranking routine 302, the plotting routine 304, the calculation routine 306 and the selection routine 308 is primarily made from the perspective of an in-use phase of the crowdsourcing application 118.

Ranking Routine 302

The ranking routine 302 is configured to receive a data packet 310 from the database 104. The data packet 310 comprises past performance data 112 associated with the plurality of human assessors 106.

In some non-limiting embodiments of the present technology, the ranking routine 302 is configured to generate a ranked list of assessors for each type of task. In other words, the ranking routine 302 is configured to rank the plurality of human assessors 106 that have previously completed a same type of task based on the one or more difficulties and respective success rate.

For example, the ranking routine 302 is configured to assign a ranking score to, inter alia, the first human assessor 106-1 and the second human assessor 106-2 for "A-1" type tasks based on the difficulties and respective success rate. How the ranking routine 302 is configured to assign the ranking score to the human assessors 106 based on the difficulties and respective success rate is not limited. For example, the ranking score may be the result of a sum, a product, or any other mathematical formula taking into account the difficulty and the success rate as variables. In some non-limiting embodiments, difficulty may be assigned a weighted coefficient, such that a given human assessor who has primarily done difficult tasks at a lower success rate is not necessarily ranked beneath another given human assessor who has primarily done easy tasks at a high success rate.

How the ranking score of the human assessors 106 is implemented is not limited. For example, the ranking score may be implemented as a numerical value and the like. It is also contemplated that the ranking score may be bounded within a range (ex. between 1 and 100). In some non-limiting embodiments of the present technology, the ranking score of the human assessors 106 is implemented such that a given human assessor is assigned a unique ranking score. In other words, if there are a hundred human assessors 106, each one of the human assessors 106 is assigned a number between 1 and 100, such that no same human assessor be assigned a same ranking score. In alternative non-limiting embodiments of the present technology, it is contemplated that a same ranking score can be assigned for more than a single human assessor. For example, this may happen when two human assessors have completed similar types of tasks at a similar success rate. In other words, each human assessor 106 is assigned a score based on the difficulty and the success rate of the tasks but are not ranked vis-a-vis the other human assessors 106.

Let us assume for the purpose of explanation that the ranking routine 302 has generated four ranked lists of assessors, namely a first ranked list of assessors 312 ranking the performance of human assessors 106 vis-à-vis "A-1" type tasks, a second ranked list of assessors 314 ranking the performance of human assessors 106 vis-à-vis "A-2" type tasks, a third ranked list of assessors 316 ranking the performance of human assessors 106 vis-à-vis "B-1" type tasks, and a fourth ranked list of assessors 318 ranking the performance of human assessors 106 vis-à-vis "B-2" type tasks.

Plotting Routine 304

The plotting routine 304 is configured to receive a data packet 320 from the ranking routine 302. The data packet 320 comprises the first ranked list of assessors 312, the second ranked list of assessors 314, the third ranked list of assessors 316, and a fourth ranked list of assessors 318.

In some non-limiting embodiments of the present technology, the plotting routine 304 is configured to generate a graph for each ranked list of assessors. In some non-limiting embodiments of the present technology, the generated graph illustrates a ranking of a given human assessor as a percentile with respect to the other human assessors (discussed in detail below).

Figure 4:
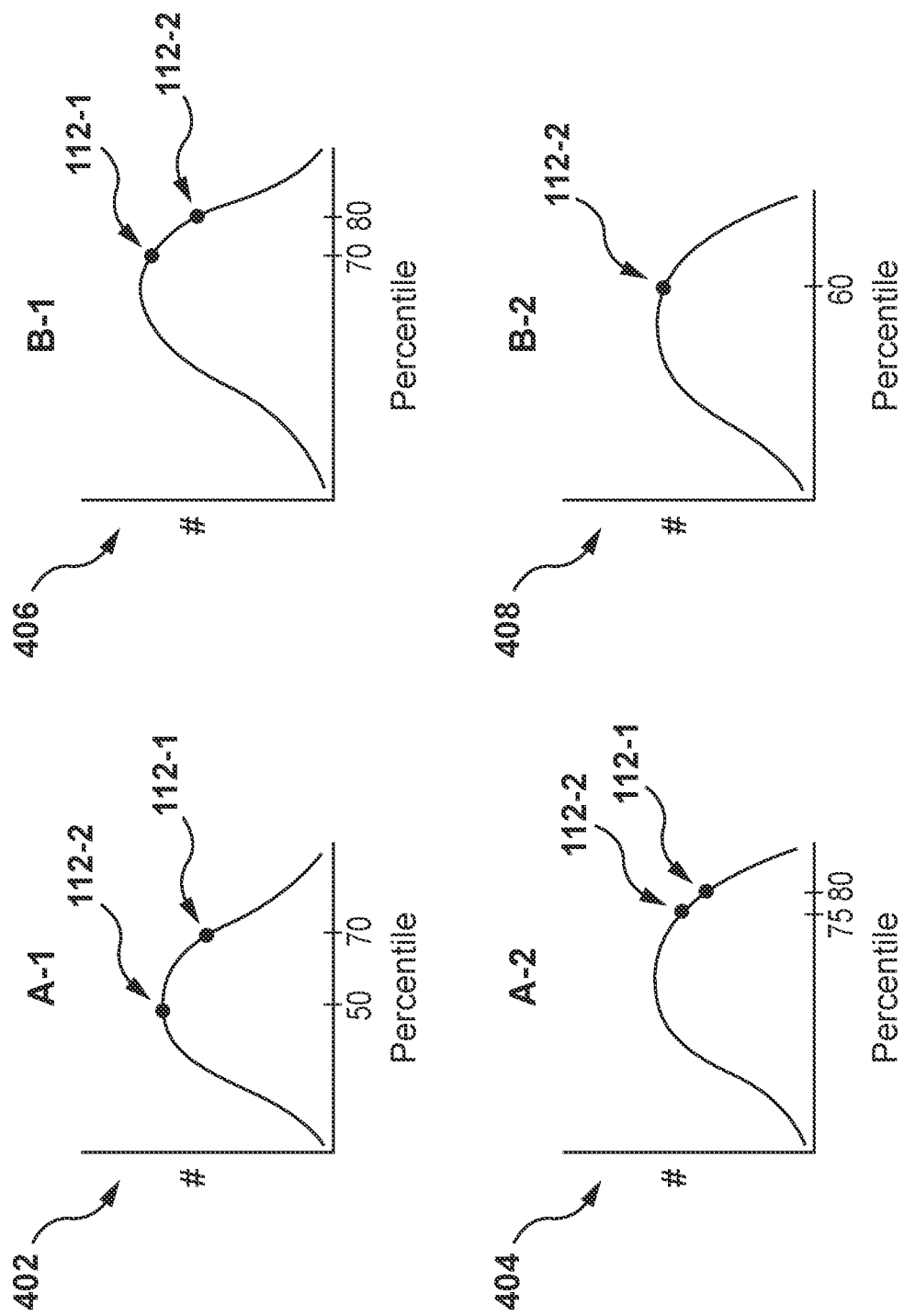
FIG. 4 illustrates graphs generated by the crowdsourcing application of the system of FIG. 1.

Referring to FIG. 4, there is illustrated four graphs generated by the plotting routine 304, each graph being generated with a respective ranked list of assessors.

More precisely, a first graph 402 illustrates a distribution of the rank scores of the human assessors 106 vis-a-vis A-1 type tasks based on the first ranked list of assessors 312, a second graph 404 illustrates the distribution of the rank scores of the human assessors 106 vis-a-vis A-2 type tasks based on the second ranked list of assessors 314, a third graph 406 illustrates the distribution of the rank scores of the human assessors 106 vis-a-vis B-1 type tasks based on the third ranked list of assessors 316 and a fourth graph 408 illustrates the distribution of the rank scores of the human assessors 106 vis-a-vis B-2 type tasks based on the fourth ranked list of assessors 318.

In some non-limiting embodiments of the present technology, the term "distribution of a ranked list of assessors" corresponds to a normal distribution (i.e. a bell curve), where the top of the curve corresponds to the mean, mode and the median of the associated ranked list. In other words, each of the first graph 402, the second graph 404, the third graph 406 and the fourth graph 408 represents a normal distribution of the rank scores of each human assessors included within the first ranked list of assessors 312, the second ranked list of assessors 314, the third ranked list of assessors 316, and a fourth ranked list of assessors 318, respectively. As such, each of the rank scores previously determined by the ranking routine 302 are converted into a percentile value within a respective graph. Needless to say, the distribution being a normal/bell curve distribution is only one non-limiting example. It is contemplated that other types of distribution be used.

More specifically, the first graph 402 corresponds to the distribution of the first ranked list of assessors 312, or in other words, the rank scores of the assessors that previously completed the "A-1" type tasks (as determined by the ranking routine 302). In at least some embodiments of the present technology, it can be said that the server may be configured to determine a percentile for respective human assessors in the ranked list based on the respective ranking scores and/or ranking positions of the respective human assessors. In some non-limiting embodiments of the present technology, the percentile of a given human assessor is determined based on the ranking position of the given human assessor within the ranked list. For example, recalling that in some non-limiting embodiments of the present technology, each human assessor is given a unique ranking score (for example, between 1 and 100), if a given human assessor is assigned a ranking score of 97 out of 100, the percentile corresponds to 97.

For example, the first human assessor 106-1 has been assigned a rank score and/or ranking position that corresponds to the $70^{th}$ percentile, whereas the second human assessor 106-2 has been assigned a rank score and/or ranking position that corresponds to the $50^{th}$ percentile, within the first ranked list of assessors 312. In other words, the first human assessor 106-1 is better at completing "A-1" type tasks than 70% of the human assessors that previously completed similar type tasks (and the second human assessor 106-2 is better than 50% of the them). The difference between the percentiles of the first human assessor 106-1 and second human assessor 106-2 may be explained by the fact that the first human assessor 106-1 has been assigned a higher rank score and/or ranking position by the ranking routine 302 for completing more difficult "A-1" type tasks with high success rates compared to the second human assessor 106-2 who only completed easy "A-1" type tasks.

Taking a look at the second graph 404, the first human assessor 106-1 has been assigned a rank score and/or ranking position that corresponds to the $80^{th}$ percentile, whereas the second human assessor 106-2 has been assigned a rank score that corresponds to the $75^{th}$ percentile. In other words, the first human assessor 106-1 is better at completing "A-2" type tasks than 80% of the human assessors that previously completed similar type tasks (and the second human assessor 106-2 is better than 75% of them).

Taking a look at the third graph 406, the first human assessor 106-1 has been assigned a rank score and/or ranking position that corresponds to the $70^{th}$ percentile, and the second human assessor 106-2 has been assigned a rank score and/or ranking position that corresponds to the $80^{th}$ percentile. In other words, the first human assessor 106-1 is better at completing "B-1" type tasks than 70% of the human assessors that previously completed similar type tasks (and the second human assessor 106-2 is better than 80% of them).

Finally, taking a look at the fourth graph 408, only the second human assessor 106-2 has been assigned a rank score and/or ranking position that corresponds to the $60^{th}$ percentile, meaning that the second human assessor 106-2 is better at completing "B-2" type tasks than 60% of the human assessors that previously completed similar type tasks. The first human assessor 106-1 has not been assigned a rank score and/or ranking position since it has not previously completed a similar type task in the past (see FIG. 2), and as such does not correspond to any percentile value within the fourth graph 408.

As noted above, the percentile of a given human assessor may be based on the ranking position of the given human assessor. As such, in some non-limiting embodiments of the present technology, there is no need to generate the first graph 402, second graph 404, third graph 406 and fourth graph 408.

Calculation Routine 306

Returning to FIG. 3, the plotting routine 304 is configured to transmit a data packet 322 to the calculation routine 306. The data packet 322 comprises the first graph 402, the second graph 404, the third graph 406 and the fourth graph 408.

In some non-limiting embodiments of the present technology, in response to receiving the data packet 322, the calculation routine 306 is configured to assign a given task score to a given human assessor for a given task type based on the percentile value of the given human assessor.

For example, recalling that the first human assessor 106-1 corresponds to the $70^{th}$ percentile vis-à-vis "A-1" type tasks, the first human assessor 106-1 may be assigned a task score of 70. Needless to say, it is contemplated that the task score be of a different value than the percentile value.

In some non-limiting embodiments of the present technology, the calculation routine 306 is further configured to determine a class score for a given human assessor based on the one or more task scores.

For ease of illustration, provided below is a table illustrating the one or more task scores associated with the first human assessor 106-1 and second human assessor 106-2, as well the resulting one or more class scores.

TABLE 1

|  | Task Score A-1 | Task Score A-2 | Class Score A | Task Score B-1 | Task Score B-2 | Class Score B |
| --- | --- | --- | --- | --- | --- | --- |
| 106-1 | 70 | 80 | 150 | 70 | 0 | 70 |
| 106-2 | 50 | 75 | 125 | 80 | 60 | 140 |

As discussed briefly above, the calculation routine 306 is configured to assign a task score for a given task to a respective human assessor. For example, the calculation routine 306 has assigned to the first human assessor 106-1 (i) a task score of 70 for completing "A-1" type tasks; and (ii) a task score of 80 for completing "A-2" type tasks. Again, these values are based on the percentile value of the first human assessor 106-1 within the first graph 402 and second graph 404.

Furthermore, the calculation routine 306 is configured to assign a class score to each human assessor. For example, the calculation routine 306 has assigned to the first human assessor 106-1 a class score of 150 which corresponds to a sum of the first human assessor's 112-1 task score A-1 (score of 70) and task score A-2 (score of 80). Needless to say, it is contemplated that the class score may be obtained via any other formula taking into account the task scores associated with class, such as a multiplication, and the like.

Needless to say, although the Table 1 illustrates only the class scores associated with the first human assessor 106-1 and the second human assessor 106-2, it should be understood that this is done for ease of understanding and it is no way intended to be limiting. It should be understood that that calculation routine 306 is configured to calculate one or more class scores associated with different human assessors depending on the task types previously completed.

Selection Routine 308

The selection routine 308 is configured to receive a data packet 324 from the task database 121. The data packet 324 includes a first task 326 and a second task 328. Needless to say, it is contemplated that the data packet 324 includes more than two tasks, or only a single task.

Let us assume that the first task 326 corresponds to a "A-3" type task (i.e. a task that falls within the "A" class, and that is different from the "A-1" and "A-2" type tasks), and the second task corresponds to a "C-1" type task (i.e. a task that falls within the "C" class, which is different from the "A" and "B" classes).

In response to receiving the data packet 324, the selection routine 308 is configured to allocate each of the first task 326 and the second task 328 to one of the plurality of human assessors 106. More specifically, the crowdsourcing application 118 is configured to determine a given one of a human assessor 106 with the highest productivity rate vis-à-vis a given task.

For ease of understanding the present technology, the following description of the allocation of the first task 326 and the second task 328 is made based on a scenario where only the first human assessor 106-1 and the second human assessor 106-2 have indicated their availability. However, it should be understood that the present technology is not limited as such and would apply mutatis mutandis to a scenario where more than two human assessors have indicated their availability.

As noted above, both the first task 326 and the second task 328 are types of tasks that have not been previously executed by the first human assessor 106-1 and the second human assessor 106-2.

In some non-limiting embodiments of the present technology, the selection routine 308 is configured to allocate each one of the first task 326 and the second task 328 based on at least the respective class score of the first human assessor 106-1 and the second human assessor 106-2.

First Task 326

As briefly explained above, the first task 326 corresponds to a new type of task (falling within the "A" class) that none of the first human assessor 106-1 or the second human assessor 106-2 executed.

In some non-limiting embodiments of the present technology, the selection routine 308 is configured to prioritize allocation of the first task 326 to the assessor having a highest-class score for the similar class (i.e. "A" class").

For example, referring back to Table 1 above, the selection routine 308 is configured to prioritize the allocation of the first task 326 to the first human assessor 106-1 since the class score for similar class tasks is the highest.

This is based on the assumption that the first task 326 is better suited to be executed by the first human assessor 106-1 since the first human assessor 106-1 has a higher class score by virtue of having successfully completed tasks of the similar class (namely the "A-1" and "A-2" type tasks) of varying difficulty compared to the second human assessor 106-2.

Second Task 328

As briefly explained above, the second task 328 corresponds to a new type of task that does not fall within any classes the first human assessor 106-1 or the second human assessor 106-2 previously executed.

In some non-limiting embodiments of the present technology, the selection routine 308 is configured to prioritize allocation of the second task 328 to the assessor having a highest aggregate class score.

More specifically, the selection routine 308 is configured to add individual class scores associated with a respective human assessor to determine its respective aggregate class score. For example, a Table 2 below illustrated the aggregate class scores for the first human assessor 106-1 and the second human assessor 106-2.

TABLE 2

| | Class Score A | Class Score B | Aggregate Class Score |
|---|---|---|---|
| 106-1 | 150 | 70 | 220 |
| 106-2 | 125 | 140 | 265 |

As illustrated above, the selection routine 308 has determined that the second human assessor 106-2 has the highest aggregate class score, and accordingly prioritize the allocation of the second task 328 to the second human assessor 106-2.

This is based on the assumption that a class of task that has never been executed by the first human assessor 106-1 or the second human assessor-2 is better suited to be executed by a human assessor that illustrates an ability to execute different classes of tasks successfully. For example, despite the fact that the first human assessor 106-1 shows better abilities to execute tasks within the "A" class compared to the second human assessor 122-2, it does not replicate the same strength for tasks within the "B" class. Rather, the second human assessor 106-2 shows a constant class score amongst the two different classes, which is indicative of a higher likelihood of successfully completing the second task 328 compared to the first human assessor 106-1.

Needless to say, it is contemplated that instead of using the aggregate class scores for ranking, it is contemplated that the selection routine 308 determines the allocation of the second task 328 based on only one of the class score (i.e. one of the "Class score A" or "Class score B").

It should be apparent from the above that the class score is used as a proxy for comparing the past performance of a given human assessor vis-à-vis the past performance of another human assessor, when executing a task of a common class or even a task of a different class.

Having determined that the first human assessor 106-1 is a better candidate to execute the first task 326, the selection routine 308 is configured to transmit the first task 326 to the electronic device 120 of the first human assessor 106-1, via the communication network 110, for completion. On the other hand, having determined that the second human assessor 106-2 is a better candidate to execute the second task 328, the selection routine 308 is configured to transmit the second task 328 to the electronic device 120 of the second human assessor 106-2, via the communication network 110, for completion.

In some non-limiting embodiments of the present technology, instead of transmitting the allocated task individually, the selection routine 308 is configured to transmit the both the first task 326 and the second task 328 to each of the first human assessor 106-1 and the second human assessor 106-2. For example, the selection routine 308 may transmit the first task 326 and the second task 328 in a ranked order, such that the first task 326 is ranked first for the first human assessor 106-1 and the second task 328 is ranked first for the second human assessor 106-2.

Generally speaking, upon reception, the first human assessor 106-1 and the second human assessor 106-2, individually, submits responses to the first task 326 and second task 328, respectively, to the crowdsourcing application 118.

As has been discussed above, the responses submitted by the first human assessor 106-1 and the second human assessor 106-2 are used as training data for training a machine learning algorithm. More specifically, the requester of the first task 326 may for example use the response by the first human assessor 106-1 as training data for training a MLA. On the other hand, the requester of the second task 328 may for example use the response by the second human assessor 106-2 as training data for training another MLA.

Although the present technology has been explained as allocating the first task 326 and the second task 328 to one of the first human assessor 106-1 and the second human assessor 106-2, it is not limited as such. As discussed, previously, the task database 121 may include one or more additional tasks that may need to be allocated to human assessors 106 who have indicated their availability.

Although the first task 326 and the second task 328 have been illustrated as individual tasks, it should be understood that it is not limited as such. It is contemplated that a given task may include more than one task of similar type. In other words, in the context of the present technology, it is contemplated that a task be akin to a project including multiple task of a similar type.

Figure 5:
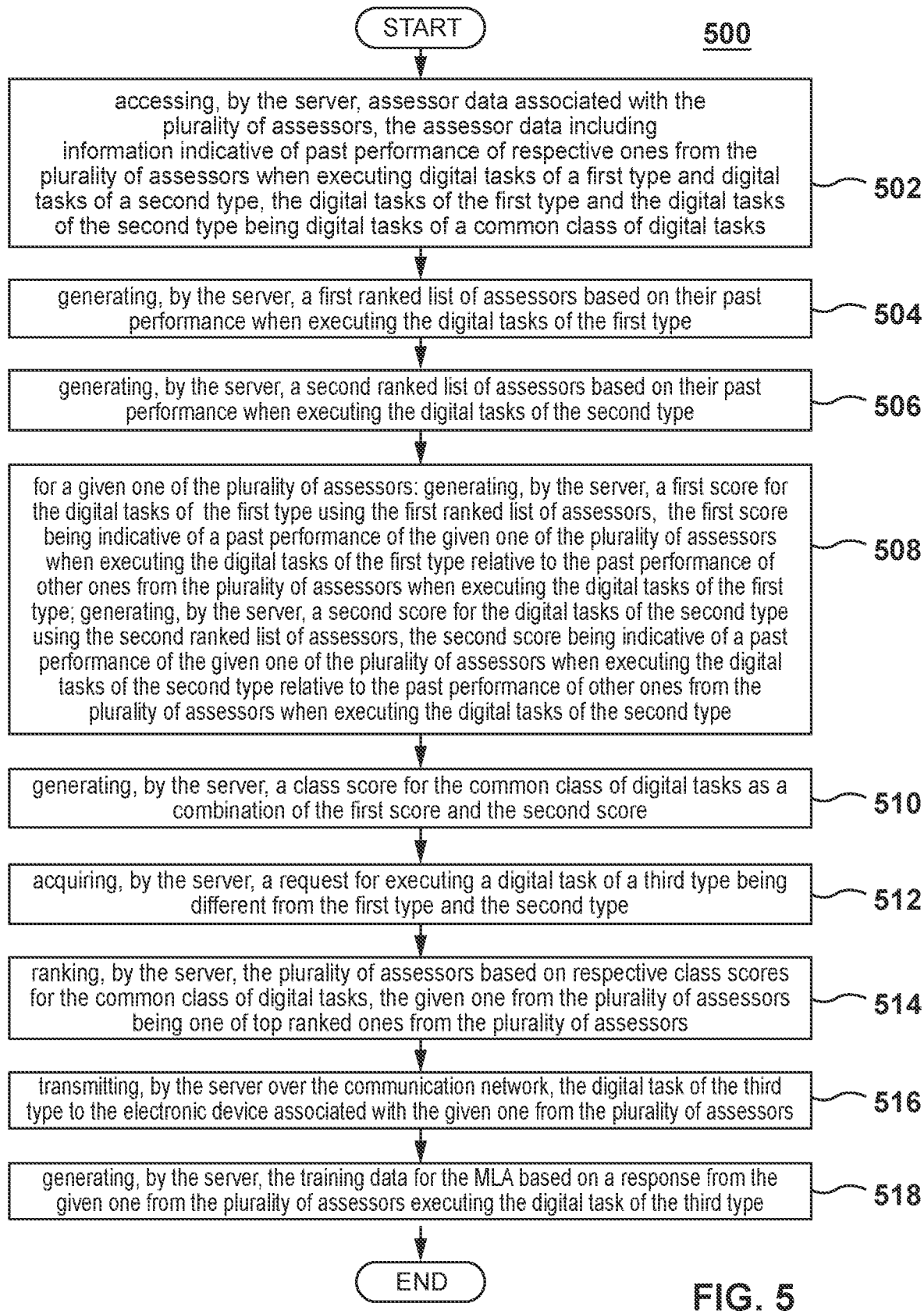
FIG. 5 depicts a flow chart of a method being executable in accordance with non-limiting embodiments of the present technology.

Given the architecture and examples provided herein above, it is possible to execute a computer-implemented method for allocating tasks in a computer-implemented crowdsource environment. With reference to FIG. 5, there is depicted a flow chart of a method 500, the method 500 being executable in accordance with non-limiting embodiments of the present technology. The method 500 can be executed by the server 102.

Step 502: accessing, by the server, assessor data associated with the plurality of assessors, the assessor data including information indicative of past performance of respective ones from the plurality of assessors when executing digital tasks of a first type and digital tasks of a second type, the digital tasks of the first type and the digital tasks of the second type being digital tasks of a common class of digital tasks The method 500 begins with step 502 where the ranking routine 302 is configured to receive the data packet 310 from the database 104. The data packet 310 comprises past performance data 112 associated with the plurality of human assessor 106.

Step 504: generating, by the server, a first ranked list of assessors based on their past performance when executing the digital tasks of the first type At step 504, the ranking routine 302 is configured to generate a ranked list of assessors for each type of task. In other words, the ranking routine 302 is configured to rank the plurality of human assessors 106 that have previously completed a same type of task based on the one or more difficulties and respective success rate.

For example, the ranking routine 302 is configured to assign a ranking score to, inter alia, the first human assessor 106-1 and the second human assessor 106-2 for "A-1" type tasks based on the difficulties and respective success rate. How the ranking routine 302 is configured to assign the ranking score to the human assessors 106 based on the difficulties and respective success rate is not limited. For example, the ranking score may be the result of a sum, a product, or any other mathematical formula taking into account the difficulties and the success rate as variables. In some non-limiting embodiments, difficulty may be assigned a weighted coefficient, such that a given human assessor who has primarily done difficult tasks at a lower success rate is not necessarily ranked beneath another given human assessor who has primarily done easy tasks at a high success rate.

Step 506: generating, by the server, a second ranked list of assessors based on their past performance when executing the digital tasks of the second type At step 506, the ranking routine 302 has generated four ranked lists of assessors, namely a first ranked list of assessors 312 ranking the performance of human assessor 106 vis-à-vis "A-1" type tasks, a second ranked list of assessors 314 ranking the performance of human assessor 106 vis-à-vis "A-2" type tasks, a third ranked list of assessors 316 ranking the performance of human assessors 106 vis-à-vis "B-1" type tasks, and a fourth ranked list of assessors 318 ranking the performance of human assessor 106 vis-à-vis "B-2" type tasks.

Step 508: for a given one of the plurality of assessors: generating, by the server, a first score for the digital tasks of the first type using the first ranked list of assessors, the first score being indicative of a past performance of the given one of the plurality of assessors when executing the digital tasks of the first type relative to the past performance of other ones from the plurality of assessors when executing the digital tasks of the first type; generating, by the server, a second score for the digital tasks of the second type using the second ranked list of assessors, the second score being indicative of a past performance of the given one of the plurality of assessors when executing the digital tasks of the second type relative to the past performance of other ones from the plurality of assessors when executing the digital tasks of the second type At step 508, the plotting routine 304 is configured to generate a graph for each ranked list of assessors. In some non-limiting embodiments of the present technology, the generated graph illustrates a ranking of a given human assessor as a percentile with respect to the other human assessors.

In some non-limiting embodiments of the present technology, the calculation routine 306 is configured to assign a given task score to a given human assessor for a given task type based on the percentile value of the given human assessor.

For example, recalling that the first human assessor 106-1 corresponds to the $70^{th}$ percentile vis-à-vis "A-1" type tasks, the first human assessor 106-1 may be assigned a task score of 70. Needless to say, it is contemplated that the task score be of a different value than the percentile value.

Step 510: generating, by the server, a class score for the common class of digital tasks as a combination of the first score and the second score At step 510, the calculation routine 306 is configured to assign a class score to each human assessor. For example, the calculation routine 306 has assigned to the first human assessor 106-1 a class score of 150 which corresponds to a sum of the first human assessor's 112-1 task score A-1 (score of 70) and task score A-2 (score of 80). Needless to say, it is contemplated that the class score may be obtained via any other formula taking into account the task scores associated with class, such as a multiplication, and the like.

Step 512: acquiring, by the server, a request for executing a digital task of a third type being different from the first type and the second type At step 512, the selection routine 308 is configured to receive a data packet 324 from the task database 121. The data packet 324 includes a first task 326 and a second task 328. Needless to say, it is contemplated that the data packet 324 includes more than two tasks, or only a single task.

Let us assume that the first task 326 corresponds to a "A-3" type task (i.e. a task that falls within the "A" class, and that is different from the "A-1" and "A-2" type tasks), and the second task corresponds to a "C-1" type task (i.e. a task that falls within the "C" class, which is different from the "A" and "B" classes).

Step 514: ranking, by the server, the plurality of assessors based on respective class scores for the common class of digital tasks, the given one from the plurality of assessors being one of top ranked ones from the plurality of assessors At step 514, In response to receiving the data packet 324, the selection routine 308 is configured to allocate each of the first task 326 and the second task 328 to one of the plurality of human assessors 106. More specifically, the crowdsourcing application 118 is configured to determine a given one of a human assessor 106 with the highest productivity rate vis-à-vis a given task.

In some non-limiting embodiments of the present technology, the selection routine 308 is configured to prioritize allocation of the first task 326 to the assessor having a highest-class score for the similar class (i.e. "A" class").

For example, referring back to Table 1 above, the selection routine 308 is configured to prioritize the allocation of the first task 326 to the first human assessor 106-1 since the class score for similar class tasks is the highest.

In some non-limiting embodiments of the present technology, the selection routine 308 is configured to prioritize allocation of the second task 328 to the assessor having a highest aggregate class score.

Step 516: transmitting, by the server over the communication network, the digital task of the third type to the electronic device associated with the given one from the plurality of assessors At step 516, having determined that the first human assessor 106-1 is a better candidate to execute the first task 326, the selection routine 308 is configured to transmit the first task 326 to the electronic device 120 of the first human assessor 106-1, via the communication network 110, for completion. On the other hand, having determined that the second human assessor 106-2 is a better candidate to execute the second task 328, the selection routine 308 is configured to transmit the second task 328 to the electronic device 120 of the second human assessor 106-2, via the communication network 110, for completion.

Step 518: generating, by the server, the training data for the MLA based on a response from the given one from the plurality of assessors executing the digital task of the third type At step 518, upon reception, the first human assessor 106-1 and the second human assessor 106-2, individually, submits responses to the first task 326 and second task 328, respectively, to the crowdsourcing application 118.

As has been discussed above, the responses submitted by the first human assessor 106-1 and the second human assessor 106-2 are used as training data for training a machine learning algorithm. More specifically, the requester of the first task 326 may for example use the response by the first human assessor 106-1 (stored in the server 102) as training data for training a MLA. On the other hand, the requester of the second task 328 may for example use the response by the second human assessor 106-2 (stored in the server 102) as training data for training another MLA.

The method 500 then terminates.

It should be apparent to those skilled in the art that at least some embodiments of the present technology aim to expand a range of technical solutions for addressing a particular technical problem encountered by the conventional crowdsourcing technology, namely allocating a task of an unknown type to a given human assessor.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A computer-implemented method of generating training data for a computer-executable Machine Learning Algorithm (MLA), the training data being based on one or more digital tasks accessible by a plurality of assessors within a computer-implemented crowdsource environment, the method being executable by a server accessible over a communication network by electronic devices associated with the plurality of assessors, the method comprising:

accessing, by the server, assessor data associated with the plurality of assessors, the assessor data including information indicative of past performance of respective ones from the plurality of assessors when executing digital tasks of a first type and digital tasks of a second type, and wherein the assessor data comprises information indicating a difficulty of the digital tasks, the digital tasks of the first type and the digital tasks of the second type being digital tasks of a first class of digital tasks;

generating, by the server, a first ranked list of assessors based on their past performance when executing the digital tasks of the first type, wherein generating the first ranked list comprises assigning a weighted coefficient to each previously executed task of the digital tasks of the first type based on a difficulty of the respective digital task and applying the weighted coefficient to a score of each of the previously executed digital tasks of the first type;

generating, by the server, a second ranked list of assessors based on their past performance when executing the digital tasks of the second type, wherein generating the second ranked list comprises assigning a weighted coefficient to each previously executed task of the digital tasks of the second type based on a difficulty of the respective digital task and applying the weighted coefficient to a score of each of the previously executed digital tasks of the second type;

for a given one of the plurality of assessors:
generating, by the server, a first score for the digital tasks of the first type using the first ranked list of assessors,
the first score being indicative of a past performance of the given one of the plurality of assessors when executing the digital tasks of the first type relative to the past performance of other ones from the plurality of assessors when executing the digital tasks of the first type;

generating, by the server, a second score for the digital tasks of the second type using the second ranked list of assessors,
the second score being indicative of a past performance of the given one of the plurality of assessors when executing the digital tasks of the second type relative to the past performance of other ones from the plurality of assessors when executing the digital tasks of the second type;
generating, by the server, a class score for the first class of digital tasks as a combination of the first score and the second score;
acquiring, by the server, a request for executing a digital task of a third type being different from the first type and the second type, wherein the digital task is of a second class different from the first class, and wherein the plurality of assessors have not previously completed any tasks of the second class;
ranking, by the server, the plurality of assessors based on respective class scores for the first class of digital tasks, the given one from the plurality of assessors being one of top ranked ones from the plurality of assessors;
transmitting, by the server over the communication network, the digital task of the third type to the electronic device associated with the given one from the plurality of assessors;
generating, by the server, the training data for the MLA based on a response from the given one from the plurality of assessors executing the digital task of the third type.

2. The method of claim 1, wherein the method further comprises, for the given one of the plurality of assessors:
generating, by the server, a fourth score for the digital tasks of a fourth type, the fourth type being a digital task of a third class;
generating a class score for the third class; and
ranking the plurality of assessors comprises ranking the plurality of assessors based on the class score of the first class and the class score of the third class.

3. The method of claim 1, wherein the first class is an image classification class, a given digital tasks of the first type being image classification of a first type of objects, a given digital tasks of the second type being image classification of a second type of objects.

4. The method of claim 1, wherein the class score is a proxy for comparing (i) the past performance of the given one of the plurality of assessors when executing digital tasks of all types from the first class against (ii) past performance of an other given one of the plurality of assessors when executing digital tasks of all types from the first class.

5. The method of claim 1, wherein the past performance of the given one of the plurality of assessors when executing digital tasks is a ratio of a number of correctly executed digital tasks by the given one of the plurality of assessors over a total number of digital tasks executed by the given one of the plurality of assessors.

6. The method of claim 1, wherein the first score is a first percentile score for the past performance of the given one of the plurality of assessors relative to the past performance of other ones from the plurality of assessors when executing the digital tasks of the first type.

7. The method of claim 1, wherein the second score is a second percentile score for the past performance of the given one of the plurality of assessors relative to the past performance of other ones from the plurality of assessors when executing the digital tasks of the second type.

8. A system for generating training data for a computer-executable machine learning algorithm (MLA), the data being based on one or more digital tasks accessible by a plurality of assessors within a computer-implemented crowdsource environment, the system comprising a server accessible over a communication network by electronic devices associated with the plurality of assessors, the server comprising a processor configured to:
access assessor data associated with the plurality of assessors, the assessor data including information indicative of past performance of respective ones from the plurality of assessors when executing digital tasks of a first type and digital tasks of a second type, and wherein the assessor data comprises information indicating a difficulty of the digital tasks,
the digital tasks of the first type and the digital tasks of the second type being digital tasks of a first class of digital tasks;
generate a first ranked list of assessors based on their past performance when executing the digital tasks of the first type, wherein generating the first ranked list comprises assigning a weighted coefficient to each previously executed task of the digital tasks of the first type based on a difficulty of the respective digital task and applying the weighted coefficient to a score of each of the previously executed digital tasks of the first type;
generate a second ranked list of assessors based on their past performance when executing the digital tasks of the second type, wherein generating the second ranked list comprises assigning a weighted coefficient to each previously executed task of the digital tasks of the second type based on a difficulty of the respective digital task and applying the weighted coefficient to a score of each of the previously executed digital tasks of the second type;
for a given one of the plurality of assessors:
generate a first score for the digital tasks of the first type using the first ranked list of assessors,
the first score being indicative of a past performance of the given one of the plurality of assessors when executing the digital tasks of the first type relative to the past performance of other ones from the plurality of assessors when executing the digital tasks of the first type;
generate a second score for the digital tasks of the second type using the second ranked list of assessors,
the second score being indicative of a past performance of the given one of the plurality of assessors when executing the digital tasks of the second type relative to the past performance of other ones from the plurality of assessors when executing the digital tasks of the second type;
generate a class score for the first class of digital tasks as a combination of the first score and the second score;
acquire a request for executing a digital task of a third type being different from the first type and the second type, wherein the digital task is of a second class different from the first class, and wherein the plurality of assessors have not previously completed any tasks of the second class;
rank the plurality of assessors based on respective class scores for the first class of digital tasks, the given one from the plurality of assessors being one of top ranked ones from the plurality of assessors;

transmit over the communication network, the digital task of the third type to the electronic device associated with the given one from the plurality of assessors;

generate the training data for the MLA based on a response from the given one from the plurality of assessors executing the digital task of the third type.

9. The system of claim 8, wherein the processor is further configured to execute, for the given one of the plurality of assessors:

generate a fourth score for the digital tasks of a fourth type, the fourth type being a digital task of a third class;

generate a class score for the third class; and rank the plurality of assessors comprises ranking the plurality of assessors based on the class score of the first class and the class score of the third class.

10. The system of claim 8, wherein the first class is an image classification class, a given digital tasks of the first type being image classification of a first type of objects, a given digital tasks of the second type being image classification of a second type of objects.

11. The system of claim 8, wherein the class score is a proxy for comparing (i) the past performance of the given one of the plurality of assessors when executing digital tasks of all types from the first class against (ii) past performance of an other given one of the plurality of assessors when executing digital tasks of all types from the first class.

12. The system of claim 8, wherein the past performance of the given one of the plurality of assessors when executing digital tasks is a ratio of a number of correctly executed digital tasks by the given one of the plurality of assessors over a total number of digital tasks executed by the given one of the plurality of assessors.

13. The system of claim 8, wherein the first score is a first percentile score for the past performance of the given one of the plurality of assessors relative to the past performance of other ones from the plurality of assessors when executing the digital tasks of the first type.

14. The system of claim 8, wherein the second score is a second percentile score for the past performance of the given one of the plurality of assessors relative to the past performance of other ones from the plurality of assessors when executing the digital tasks of the second type.

* * * * *